US007139873B1

(12) United States Patent
Ruster et al.

(10) Patent No.: US 7,139,873 B1
(45) Date of Patent: Nov. 21, 2006

(54) SYSTEM AND METHOD FOR CACHING DATA STREAMS ON A STORAGE MEDIA

(75) Inventors: Jean-Pierre Ruster, Mountain View, CA (US); Maurice Schlumberger, Menlo Park, CA (US)

(73) Assignee: Maxtor Corporation, Longmont, CO (US)

( * ) Notice: Subject to any disclaimer, the term of this patent is extended or adjusted under 35 U.S.C. 154(b) by 631 days.

(21) Appl. No.: 09/877,263

(22) Filed: Jun. 8, 2001

(51) Int. Cl.
G06F 12/02 (2006.01)

(52) U.S. Cl. .......................... 711/113; 711/4; 711/100; 711/111; 711/112; 711/165; 711/166; 707/205; 345/555

(58) Field of Classification Search ................ 709/203, 709/219; 711/112–113, 100, 111, 147, 118, 711/122, 154, 137, 200, 203, 104, 102, 109, 711/4; 345/202, 507
See application file for complete search history.

(56) References Cited

U.S. PATENT DOCUMENTS 5,339,413 A * 8/1994 Koval et al. ................ 719/314
5,497,474 A * 3/1996 Todorovich .................. 711/102
5,717,951 A * 2/1998 Yabumoto ..................... 710/11
5,737,747 A * 4/1998 Vishlitzky et al. .......... 711/118
5,870,599 A * 2/1999 Hinton et al. ............... 712/239
5,915,094 A * 6/1999 Kouloheris et al. ......... 709/219
5,936,616 A * 8/1999 Torborg et al. ............. 345/555
6,061,504 A * 5/2000 Tzelnic et al. .............. 709/219
6,092,149 A   7/2000 Hicken et al. .............. 711/113
6,161,169 A  12/2000 Cheng ........................ 711/150
6,253,299 B1* 6/2001 Smith et al. ................. 711/171
6,321,310 B1* 11/2001 McCarthy et al. .......... 711/154
6,430,651 B1* 8/2002 Isobe ......................... 711/104
6,539,458 B1* 3/2003 Holmberg ................... 711/137
6,718,410 B1* 4/2004 Slater .......................... 710/66
2001/0047456 A1* 11/2001 Schrobenhauzer et al. .. 711/122

* cited by examiner

Primary Examiner—Matthew Kim
Assistant Examiner—Zhuo H. Li
(74) Attorney, Agent, or Firm—Tejpal S. Hansra

(57) ABSTRACT

A system and method for caching and managing data streams from a storage media is disclosed. The system includes a plurality of virtual buffers for a plurality of data streams. Each data stream correlates to a virtual buffer. The system also includes a cache memory to store the plurality of virtual buffers. The system also includes a stream manager to assign the plurality of data streams to the plurality of virtual buffers.

70 Claims, 3 Drawing Sheets

SYSTEM AND METHOD FOR CACHING DATA STREAMS ON A STORAGE MEDIA

BACKGROUND OF THE INVENTION

1. Field of the Invention

The present invention relates to the field of caching data streams on a storage media, such as a disk, and more particularly, to a system and method for managing the access of data streams between a storage media and a host.

2. Discussion of the Related Art

Users may access large amounts of data, such as video and audio files, stored on a disk. The data may be read from or written to the disk in data streams. Most known modern disk drives may use caching schemes to improve the perceived performance of accessing and reading the data from the disk. Streams, such as audio and video, may have two main characteristics that separate them from classical storage access schemes. First, data streams may need specific caching to deliver the continuous flow of data on time. A data stream may deliver at, or very close to, a specific instant, as opposed to typical data accesses that are focused on delivery as soon as possible. Second, streaming data is transient in that once accessed, typically, the data may not be accessed again by the same stream. The data is accessed sequentially. Thus, any data that is "before" another block of accessed data may be discarded.

Synchronization and transient access to data may be compromised when multiple streams are involved, for example, when the system records a set of streams from a satellite dish while outputting another stream to a video monitor. In most cases, disturbances in the stream delivery may be handled with sufficiently large buffers. As a general rule, the size of the buffer may be made proportional to the throughput of the stream. The minimum margin of time to avoid hiccoughs is substantially 0.5 seconds, with on the order of 2.0 seconds being recommended in practical instances. The buffers, in turn, may become very large and costly, especially when the number of streams increase.

To guarantee on-time delivery of streaming data, each stream needs a large buffer to smoothen the irregularities of incoming and outgoing flows. One approach to manage multiple streams has been to use a round-robin algorithm to allocate the input/output ("I/O") streams to their fixed buffers. A buffer manager may assign and read buffers on a rotating basis. The buffers are not managed according to any priority. This approach manages the streams, but may not be optimal in delivering the data streams.

Another approach involves using a priority scheme that allocates I/O data streams according to the status of the buffers. For example, the fuller a read buffer is, the lower its priority may be. The priority approach may be more complicated and harder to program, but it improves the quality of the buffer management. Improvements may include decreased buffer size and the number of simultaneous streams that can be managed. For example, data streams of about 8 Mb/s in a shared environment may need buffers of about 1 MB per stream. If the number of streams approach 5 to 10, then this approach may be unrealistic due to memory constraints.

Thus, these approaches suffer from not allocating buffers according to priority, or having increasing amounts of memory dedicated to buffers. Another shortfall is not utilizing buffer space in an efficient manner. On average, each buffer is about half full, or half empty. The empty space in the buffer is not being utilized for data streaming operations and is useless to global buffering. The extra space may be helpful in handling disturbances, or hiccoughs, in the data stream, but is otherwise mis-allocated. Thus, current approaches to data, stream management may be wasteful, or inefficient.

SUMMARY OF THE INVENTION

To achieve these and other advantages and in accordance with the purpose of the present invention, as embodied and broadly described, a system and method for managing data stream caches from a storage media is disclosed.

According to an embodiment of the present invention, a system for managing a plurality of data streams from a storage media is disclosed. The system includes a plurality of virtual buffers for the plurality of data streams. Each data stream correlates to a virtual buffer. The system also includes a cache memory to store the plurality of virtual buffers. The system also includes a stream manager to assign the plurality of data streams to the plurality of virtual buffers.

In another embodiment of the present invention, a system for managing data access from a storage media to a host is disclosed. The system includes a stream manager to receive a command from the host. The stream manager also determines a status of a data stream corresponding to the command. The system also includes a cache memory to store a virtual buffer corresponding to the data stream when the command comprises an existing stream. The system also includes a cache memory manager to allocate the virtual buffer in the cache memory for the data stream when the command comprises a new stream. The data stream is read from the storage media into the cache.

In another embodiment of the present invention, a method for managing data streams from a storage media is disclosed. The method includes assigning a data stream to a virtual buffer by a stream manager. The method also includes storing the virtual buffer in a cache memory. The method also includes accessing the data stream of the virtual buffer by the stream manager in response to a host command.

In another embodiment of the present invention, a method for determining a status for a command from a host for a data stream from a storage media is disclosed. The method includes determining whether the data stream is stored in a cache memory by a stream manager. The method also includes transferring the data stream from the storage media to a virtual buffer within the cache memory if the data stream is not within the cache memory. The method also includes transferring the data stream to the host.

In another embodiment of the present invention, a method for managing a data stream from a storage media is disclosed. The method includes allocating a virtual buffer within a cache memory for the data stream. The method also includes transferring the data stream from the storage media to the virtual buffer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
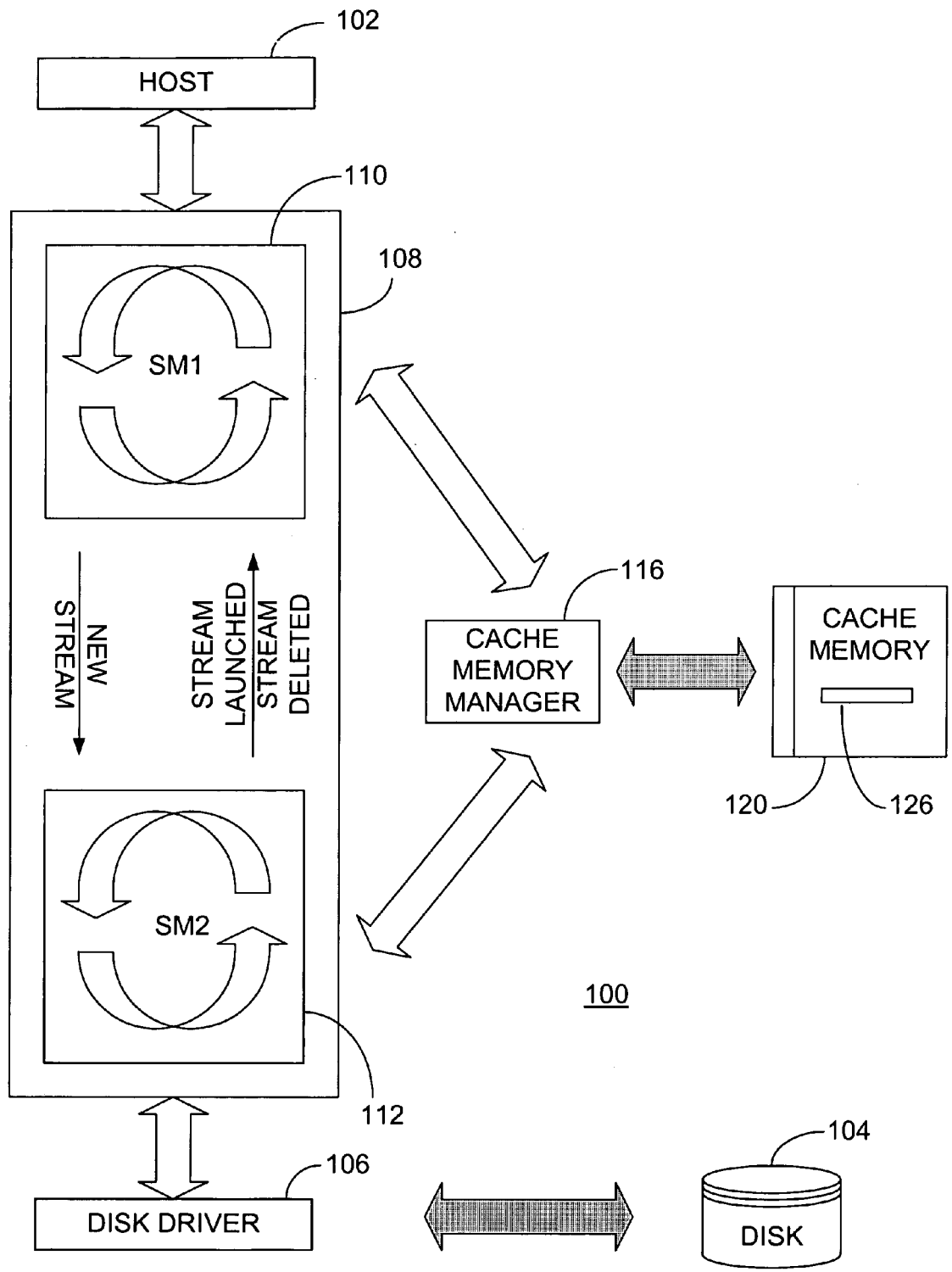
FIG. 1 illustrates a block diagram of a system for managing a data stream in accordance with an embodiment of the present invention.

FIG. 1 depicts a block diagram of a system for managing a data stream in accordance with an embodiment of the present invention. System 100 may be any system, network or device that sends and retrieves data. Host 102 may access disk 104. Host 102 may write data onto disk 104, but for simplicity, reading operations will be disclosed with regard to system 100. Disk 104 may be any storage media capable of storing data in a digital form, such as video or audio files. Disk 104 also may store other types of data, as long as it is retrievable by system 100. Disk 104 may be a magnetic disk, a floppy disk, a compact disk, a digital video disk, a tape and the like. Disk driver 106 may engage disk 104 to retrieve data. Disk driver 106 may use any known method to extract data from disk 104.

Data from disk 104 may be read as data streams. As noted above, data streams are different from other known storage access schemes. Data streams may be delivered continuously and at, or close to, a specific instance. In addition, data streams may be transient in that the data is accessed once. Data streams may be useful, particularly for video and audio files. Video and audio files are desired to be in a temporal order, such as watching a film clip or listening to a song. Delivering data out of sequence will render the file unintelligible.

Within system 100, host 102 issues a command to retrieve a data file from disk 104. Preferably, the data file will be delivered to host 102 as a data stream. Disk driver 106 is used to read the file and deliver it to host 102. The command is received by stream manager 108. Stream manager 108 may be a software component, a hardware component, or a combination of both. Preferably, stream manager 108 is a software component. Stream manager 108 assigns data streams from disk driver 106 and disk 104 to a virtual buffer within cache memory 120.

A virtual buffer may be memory space within cache memory 120, 4 instead of an actual buffer. Each stream has its own virtual buffer. A virtual buffer is not a specified fixed location in cache memory 120, but is allocated dynamically. By using virtual buffers, data streams appear to be allocated to a buffer. Stream manager 108 decides which virtual buffer is to be filled by a data stream. Cache memory manager 116 allocates the memory space within cache memory 120 for the virtual buffer. Thus, embodiments of the present invention do not decrease the size of the used, or full, space allocated to each stream, but pools the unused or empty space by storing the virtual buffers in cache memory 120. Therefore, the wasted unused or empty space is reduced significantly compared to traditional buffer allocation schemes.

Stream manager 108 may be comprised of stream sub-manager 110 and stream sub-manager 112. Stream sub-manager 110 and stream sub-manager 112 may be different functional components within stream manager 108. Stream sub-manager 110 and stream sub-manager 112 are discussed separately to better understand the embodiments of the present invention.

Stream sub-manager 110 determines if the requested data stream is stored in cache memory 120. If so, then stream manager 108 retrieves the data stream from virtual buffer 126 within cache memory 120. Cache memory manager 116 locates the memory location for virtual buffer 126 in cache memory 120. Virtual buffer 126 stores the data stream in cache memory 120. Thus, if stream sub-manager 110 determines that the data stream is within cache memory 120, the data stream is retrieved from virtual buffer 126 and delivered to host 102.

If the command correlates to a data stream not known within cache memory 120, then stream sub-manager 110 notifies stream sub-manager 112 that a new data stream is to be known. Stream sub-manager 112 retrieves the data stream from disk 104 via disk driver 106. Stream manager 108 assigns a virtual buffer to the retrieved data stream in cache memory. Cache memory manager 116 allocates the virtual buffer.

According to an embodiment, each data stream virtual buffer is a linked list of cache locations within cache memory 120. A new location may be taken from an "available" list and added to the linked list when the virtual buffer is expanded. Further, the location may be taken off the linked list and placed back onto the available list when the contents in the location have been depleted. As this is a sequential access pattern, system 100 should not go back to a given data item after the data item has been accessed. Thus, the location of the data item may be placed back on the available list. If the available list is empty, then no space is left in cache memory 120 for buffering new streaming operations. Data stream operations between disk 104 and cache memory 120 may be stopped until cache locations within cache memory 120 are freed by the normal stream operations.

Embodiments of the present invention may implement particular actions for the beginning and ending of the streaming operations. System 100 may notice that a new stream is added. System 100, using stream manager 108, should gauge the new stream, in particular its throughput, and ask cache memory manager 116 to allocate cache space accordingly. Stream manager 108 aims at allocating enough buffer space to the new stream, but not so much that other streams are starved, or held up. In other words, stream manager 108 should balance the needs of new data streams with the limits on cache resources. The initial allocation should be enough to set up the specific stream and get it operating. Stream manager 108 may have to reallocate buffer space to the data stream. Further, stream manager 108 should check if the addition of a new stream may be safely handled without disrupting system resources or if the new data stream should be rejected for global performance reasons. Problems may occur if servicing the new data stream pushes stream manager 108 over its limit and may prevent an existing data stream from being serviced properly.

Therefore, according to embodiments of the present invention, a data stream may be stored and retrieved from cache memory 120. The data stream may use virtual buffer 126 within cache memory 120. Virtual buffer 126 may add locations from an availability list if demands for more memory space dictate a larger buffer, but without unnecessarily tying up memory resources.

Figure 2A:
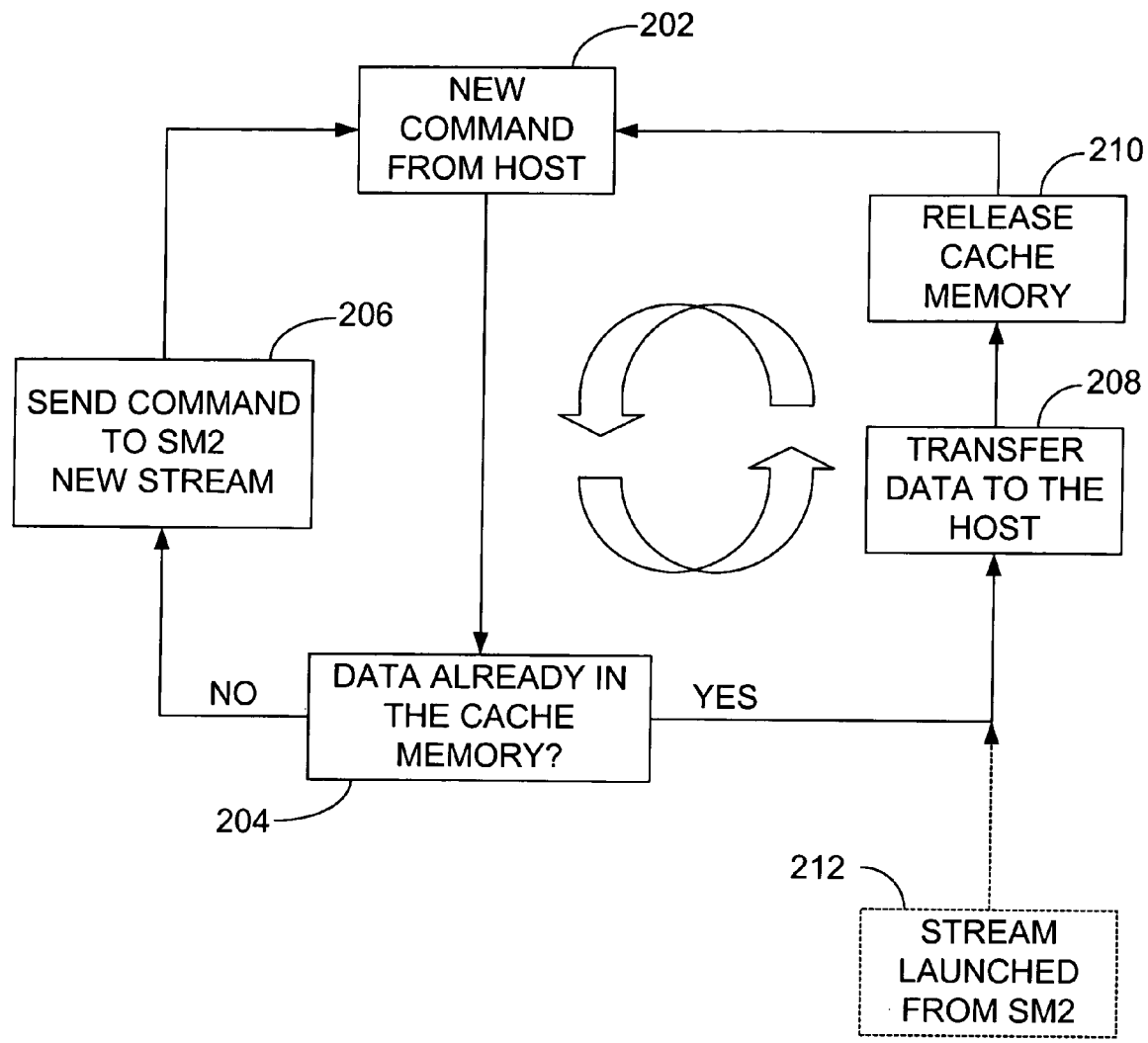
FIG. 2A illustrates a flowchart for transferring a data stream to a host from a stream manager in accordance with an embodiment of the present invention.

FIG. 2A illustrates a flowchart for transferring a data stream to a host from a stream manager in accordance with an embodiment of the present invention. Reference will be made to the appropriate elements disclosed in FIG. 1. Step 202 executes by receiving a new command from host 102. Preferably, the command is received by stream manager 108, and, more preferably, the command is received by stream sub-manager 110. Step 204 executes by determining whether the data for the command is stored in cache memory 120. Preferably, stream sub-manager 110 makes this determination. If no, then step 206 is executed by sending a command to stream sub-manager 112 that a new stream is to be allocated and created, as disclosed below with reference to FIG. 2B.

If step 204 is yes, then step 208 executes by transferring the data stream to host 102 in response to the received command. The data stream is stored in virtual buffer 126. Stream manager 108 knows that the data stream for the received command is assigned to virtual buffer 126, and cache memory manager 116 identifies the location of virtual buffer 126. Step 210 executes by releasing the location of virtual buffer 126 within cache memory 120 back to the available list when the data stream has been processed. As noted above, the data stream should not need to be retrieved again and the cache space is released. Step 212 executes by indicating to stream manager 108 that a new stream has been launched from stream sub-manager 112 in response to step 206.

Figure 2B:
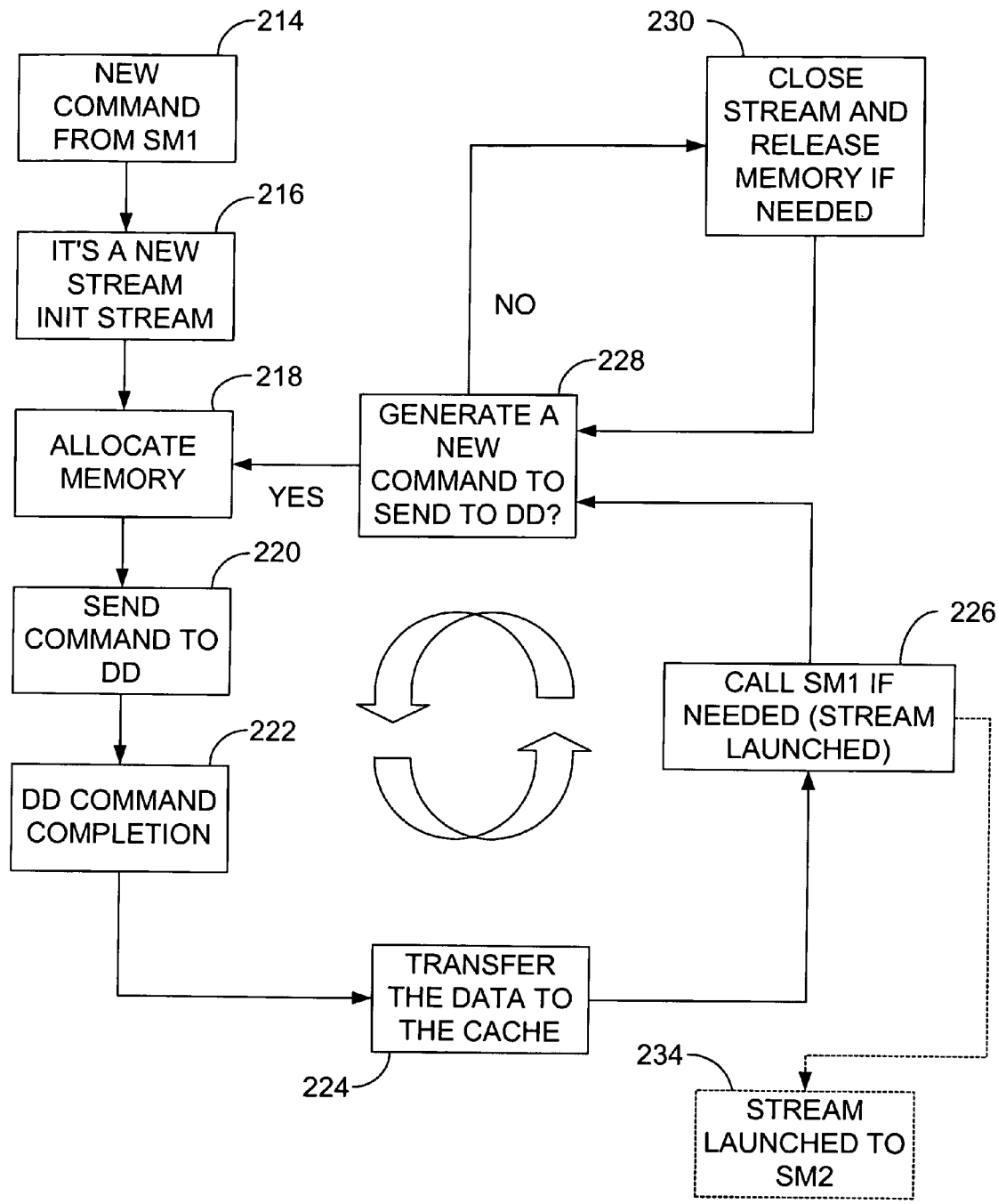
FIG. 2B illustrates a flowchart for transferring a data stream from a storage media in accordance with an embodiment of the present invention.

FIG. 2B illustrates a flowchart for transferring a data stream from a storage media in accordance with an embodiment of the present invention. Step 214 executes by receiving the new command from stream sub-manager 110 at stream sub-manager 112. The new command may be forwarded in step 206 in FIG. 2A. Step 216 executes by noting a new data stream is to be retrieved in response to the new command. The new data stream is to be initialized. Step 218 executes by allocating memory in cache memory 120 for the new data stream. Stream manager 108 may assign the memory, or virtual buffer 126, while cache memory manager 116 allocates the memory.

Step 220 executes by sending the command to disk driver 106 to read the corresponding data from disk 104. Step 222 executes by indicating completion of the command by disk driver 106. Step 224 executes by transferring the data retrieved from disk 104 to virtual buffer 126 in cache memory 120. Step 226 executes by calling stream sub-manager 110, if desired, and indicating the new data stream has been launched. Step 228 executes by determining whether a new command should be generated and sent to disk driver 106. If yes, then the flowchart returns to step 218. If no, then step 230 executes by determining if the data stream should be closed, and, if so, closing it, releasing the memory in cache memory 120.

Step 234 executes by indicating that a data stream has been launched to stream sub-manager 112. This step is for the other components of stream manager 108.

Thus, a system and method has been disclosed for managing data streams from a storage media. For example, a user desires to retrieve a video file from a disk. The video file delivers data to the user sequentially, such that once the data has been viewed, the user probably does not have a need to see it again. A host, such as a computer or other user interface sends a command to retrieve the file from the disk. A stream manager receives the command and determines whether the data stream for the file is within a cache memory. If the data is within the cache memory, then the stream manager retrieves the file and delivers the file to the host.

The data stream may use a virtual buffer within the cache memory as its memory location. The virtual buffer is assigned to the data stream by the stream manager. A cache memory manager allocates the space for the virtual buffer and knows the location of the virtual buffer within cache memory. Thus, any "unused" portion of the virtual buffer is placed back into the available memory for data stream operations. Further, an availability list may indicate memory locations within the cache memory that are free in case the virtual buffer requires additional memory space. The data stream acts as if it has been assigned to a buffer.

If the data for the received command is not in the cache memory, then the stream manager may send the command to the disk driver to retrieve the data stream for the file from the disk. The data stream is read from the disk and placed in a virtual buffer in cache memory 120. The data stream then may be delivered to the host.

The disclosed embodiments have advantages when two or more data streams are handled. The total cache size may be reduced by allocating unused buffer space back to the cache memory. When the total cache space is limited, the disclosed embodiments may allow for the safe and efficient handling of more streams than known allocation schemes.

It will be apparent to those skilled in the art that various modifications and variations can be made to the present invention without departing from the spirit or scope of the invention. Thus, it is intended that the present invention covers modifications and variations that come within the scope of any claims and their equivalents.

What is claimed is:

1. In a disk drive that includes a cache memory and a disk, a method for caching a data stream, comprising:
   receiving a command from a host to access the data stream;
   dynamically allocating a virtual buffer in the cache memory in response to the command and the data stream, including determining the memory locations in the cache memory for the virtual buffer in response to the available space in the cache memory and determining the size of the virtual buffer in response to the data stream, thereby decreasing the available space in the cache memory;
   transferring the data stream from the disk to the virtual buffer;
   transferring the data stream from the virtual buffer to the host; and
   releasing the virtual buffer from the cache memory in response to transferring the data stream to the host, thereby increasing the available space in the cache memory.

2. The method of claim 1, wherein dynamically allocating the virtual buffer includes determining the data stream is not stored in the cache memory.

3. The method of claim 1, wherein dynamically allocating the virtual buffer includes transferring the memory locations from an available list to a linked list.

4. The method of claim 1, wherein dynamically allocating the virtual buffer includes determining the throughput of the data stream.

5. The method of claim 1, wherein dynamically allocating the virtual buffer includes determining the data stream shall be safely handled without disrupting system resources.

6. The method of claim 1, wherein dynamically allocating the virtual buffer includes determining the data stream shall not be rejected for global performance reasons.

7. The method of claim 1, wherein dynamically allocating the virtual buffer includes determining the data stream shall not prevent another data stream stored in the cache memory from being serviced properly.

8. The method of claim 1, wherein dynamically allocating the virtual buffer includes determining the cache memory has available space for the data stream.

9. The method of claim 1, wherein dynamically allocating the virtual buffer includes determining another data stream to be stored in the cache memory shall not be held up.

10. The method of claim 1, wherein dynamically allocating the virtual buffer includes balancing the needs of another data stream to be stored in the cache memory with the limits of the cache memory.

11. The method of claim 1, wherein transferring the data stream to the virtual buffer fills the virtual buffer.

12. The method of claim 1, wherein releasing the virtual buffer includes transferring the memory locations from a linked list to an available list.

13. The method of claim 1, wherein data stream operations between the cache memory and the disk are stopped until normal data stream operations make space available in the cache memory.

14. The method of claim 1, wherein the cache memory includes the virtual buffer and an additional virtual buffer, the data stream is stored in the virtual buffer and an additional data stream is stored in the additional virtual buffer before transferring the data stream to the host.

15. The method of claim 1, wherein the host is a computer.

16. The method of claim 1, wherein the host is a user interface.

17. The method of claim 1, wherein the disk is a magnetic disk.

18. The method of claim 1, wherein the disk is a digital video disk.

19. The method of claim 1, wherein the data stream is a video file.

20. The method of claim 1, wherein the data stream is an audio file.

21. In a disk drive that includes a cache memory and a disk, a method for caching a data stream, comprising:
   receiving a command from a host to access the data stream;
   dynamically allocating a virtual buffer in the cache memory in response to the command and the data stream, including determining the data stream is not stored in the cache memory, determining the memory locations in the cache memory for the virtual buffer in response to the available space in the cache memory and determining the size of the virtual buffer in response to the data stream, thereby decreasing the available space in the cache memory for another virtual buffer;
   transferring the data stream from the disk to the virtual buffer;
   transferring the data stream from the virtual buffer to the host; and
   releasing the virtual buffer from the cache memory in response to transferring the data stream to the host, thereby increasing the available space in the cache memory.

22. The method of claim 21, wherein dynamically allocating the virtual buffer includes transferring the memory locations from an available list to a linked list, and releasing the virtual buffer includes transferring the memory locations from the linked list to the available list.

23. The method of claim 21, wherein dynamically allocating the virtual buffer includes determining the throughput of the data stream.

24. The method of claim 21, wherein dynamically allocating the virtual buffer includes determining the data stream shall be safely handled without disrupting system resources.

25. The method of claim 21, wherein dynamically allocating the virtual buffer includes determining the data stream shall not prevent another data stream stored in the cache memory from being serviced properly.

26. The method of claim 21, wherein dynamically allocating the virtual buffer includes determining the cache memory has available space for the data stream.

27. The method of claim 21, wherein dynamically allocating the virtual buffer includes determining another data stream to be stored in the cache memory shall not be held up.

28. The method of claim 21, wherein transferring the data stream to the virtual buffer fills the virtual buffer.

29. The method of claim 21, wherein the host is a user interface.

30. The method of claim 21, wherein the data stream is a video file or an audio file.

31. In a disk drive that includes a cache memory and a disk, a method for caching data streams, comprising:
   receiving a command from a host to access a data stream;
   dynamically allocating a virtual buffer in the cache memory in response to the command and the data stream, including determining the data stream is not stored in the cache memory, determining the memory locations in the cache memory for the virtual buffer in response to the available space in the cache memory and determining the size of the virtual buffer in response to the data stream, thereby decreasing the available space in the cache memory for another virtual buffer;
   transferring the data stream from the disk to the virtual buffer;
   receiving an additional command from the host to access an additional data stream;
   dynamically allocating an additional virtual buffer in the cache memory in response to the additional command and the additional data stream, including determining the additional data stream is not stored in the cache memory, determining the memory locations in the cache memory for the additional virtual buffer in response to the available space in the cache memory and determining the size of the additional virtual buffer in response to the additional data stream, thereby further decreasing the available space in the cache memory for another virtual buffer; then
   transferring the additional data stream from the disk to the additional virtual buffer;
   transferring the data stream from the virtual buffer to the host;
   releasing the virtual buffer from the cache memory in response to transferring the data stream to the host, thereby increasing the available space in the cache memory;
   transferring the additional data stream from the additional virtual buffer to the host; and
   releasing the additional virtual buffer from the cache memory in response to transferring the additional data stream to the host, thereby further increasing the available space in the cache memory.

32. The method of claim 31, wherein dynamically allocating the virtual buffer includes transferring the memory locations from an available list to a linked list, and releasing the virtual buffer includes transferring the memory locations from the linked list to the available list.

33. The method of claim 31, wherein dynamically allocating the virtual buffer includes determining the throughput of the data stream.

34. The method of claim 31, wherein dynamically allocating the virtual buffer includes determining the data stream shall be safely handled without disrupting system resources.

35. The method of claim 31, wherein dynamically allocating the virtual buffer includes determining the data stream shall not prevent another data stream stored in the cache memory from being serviced properly.

36. The method of claim 31, wherein dynamically allocating the virtual buffer includes determining the cache memory has available space for the data stream.

37. The method of claim 31, wherein dynamically allocating the virtual buffer includes determining another data stream to be stored in the cache memory shall not be held up.

38. The method of claim 31, wherein transferring the data stream to the virtual buffer fills the virtual buffer.

39. The method of claim 31, wherein the host is a user interface.

40. The method of claim 31, wherein the data stream is a video file or an audio file.

41. In a disk drive that includes a cache memory and a disk, a method for caching a data stream, comprising:
  receiving a command from a host to access the data stream, wherein the host is a user interface and the data stream is a video file or an audio file;
  dynamically allocating a virtual buffer in the cache memory in response to the command and the data stream, including determining the data stream is not stored in the cache memory, determining the memory locations in the cache memory for the virtual buffer in response to the available space in the cache memory and determining the size of the virtual buffer in response to the data stream, thereby decreasing the available space in the cache memory for another virtual buffer;
  transferring the data stream from the disk to the virtual buffer;
  transferring the data stream from the virtual buffer to the host; and
  releasing the virtual buffer from the cache memory in response to transferring the data stream to the host, thereby increasing the available space in the cache memory.

42. The method of claim 41, wherein dynamically allocating the virtual buffer includes transferring the memory locations from an available list to a linked list, and releasing the virtual buffer includes transferring the memory locations from the linked list to the available list.

43. The method of claim 41, wherein dynamically allocating the virtual buffer includes determining the throughput of the data stream.

44. The method of claim 41, wherein dynamically allocating the virtual buffer includes determining the data stream shall be safely handled without disrupting system resources.

45. The method of claim 41, wherein dynamically allocating the virtual buffer includes determining the data stream shall not prevent another data stream stored in the cache memory from being serviced properly.

46. The method of claim 41, wherein dynamically allocating the virtual buffer includes determining the cache memory has available space for the data stream.

47. The method of claim 41, wherein dynamically allocating the virtual buffer includes determining another data stream to be stored in the cache memory shall not be held up.

48. The method of claim 41, wherein transferring the data stream to the virtual buffer fills the virtual buffer.

49. The method of claim 41, wherein the data stream is a video file.

50. The method of claim 41, wherein the data stream is an audio file.

51. In a disk drive that includes a cache memory and a disk, a method for caching a data stream, comprising:
  receiving a command from a host to access the data stream, wherein the host is a user interface and the data stream is a video file or an audio file;
  dynamically allocating a virtual buffer in the cache memory in response to the command and the data stream, including determining the data stream is not stored in the cache memory, determining the memory locations in the cache memory for the virtual buffer including transferring the memory locations from an available list to a linked list in response to the available space in the cache memory and determining the size of the virtual buffer in response to the data stream, thereby decreasing the available space in the cache memory for another virtual buffer;
  transferring the data stream from the disk to the virtual buffer;
  transferring the data stream from the virtual buffer to the host; and
  releasing the virtual buffer from the cache memory in response to transferring the data stream to the host, including transferring the memory locations from the linked list to the available list, thereby increasing the available space in the cache memory.

52. The method of claim 51, wherein dynamically allocating the virtual buffer includes determining the data stream shall not be rejected for global performance reasons.

53. The method of claim 51, wherein dynamically allocating the virtual buffer includes determining the throughput of the data stream.

54. The method of claim 51, wherein dynamically allocating the virtual buffer includes determining the data stream shall be safely handled without disrupting system resources.

55. The method of claim 51, wherein dynamically allocating the virtual buffer includes determining the data stream shall not prevent another data stream stored in the cache memory from being serviced properly.

56. The method of claim 51, wherein dynamically allocating the virtual buffer includes determining the cache memory has available space for the data stream.

57. The method of claim 51, wherein dynamically allocating the virtual buffer includes determining another data stream to be stored in the cache memory shall not be held up.

58. The method of claim 51, wherein transferring the data stream to the virtual buffer fills the virtual buffer.

59. The method of claim 51, wherein the data stream is a video file.

60. The method of claim 51, wherein the data stream is an audio file.

61. In a disk drive that includes a cache memory and a disk, a method for caching data streams, comprising:
  receiving a command from a host to access a data stream, wherein the host is a user interface and the data stream is a video file or an audio file;

dynamically allocating a virtual buffer in the cache memory in response to the command and the data stream, including determining the data stream is not stored in the cache memory, determining the memory locations in the cache memory for the virtual buffer in response to the available space in the cache memory and determining the size of the virtual buffer in response to the data stream, thereby decreasing the available space in the cache memory for another virtual buffer;

transferring the data stream from the disk to the virtual buffer;

receiving an additional command from the host to access an additional data stream;

dynamically allocating an additional virtual buffer in the cache memory in response to the additional command and the additional data stream, including determining the additional data stream is not stored in the cache memory, determining the memory locations in the cache memory for the additional virtual buffer in response to the available space in the cache memory and determining the size of the additional virtual buffer in response to the additional data stream, thereby further decreasing the available space in the cache memory for another virtual buffer; then transferring the additional data stream from the disk to the additional virtual buffer;

transferring the data stream from the virtual buffer to the host;

releasing the virtual buffer from the cache memory in response to transferring the data stream to the host, thereby increasing the available space in the cache memory;

transferring the additional data stream from the additional virtual buffer to the host; and releasing the additional virtual buffer from the cache memory in response to transferring the additional data stream to the host, thereby further increasing the available space in the cache memory.

62. The method of claim 61, wherein dynamically allocating the virtual buffer includes transferring the memory locations from an available list to a linked list, and releasing the virtual buffer includes transferring the memory locations from the linked list to the available list.

63. The method of claim 61, wherein dynamically allocating the virtual buffer includes determining the throughput of the data stream.

64. The method of claim 61, wherein dynamically allocating the virtual buffer includes determining the data stream shall be safely handled without disrupting system resources.

65. The method of claim 61, wherein dynamically allocating the virtual buffer includes determining the data stream shall not prevent another data stream stored in the cache memory from being serviced properly.

66. The method of claim 61, wherein dynamically allocating the virtual buffer includes determining the cache memory has available space for the data stream.

67. The method of claim 61, wherein dynamically allocating the virtual buffer includes determining another data stream to be stored in the cache memory shall not be held up.

68. The method of claim 61, wherein transferring the data stream to the virtual buffer fills the virtual buffer.

69. The method of claim 61, wherein the data stream is a video file.

70. The method of claim 61, wherein the data stream is an audio file.

* * * * *